Aug. 22, 1933.                E. E. WICKERSHAM                1,923,405
                                 PICK-UP FEEDER
                              Filed Jan. 24, 1928          8 Sheets-Sheet 1
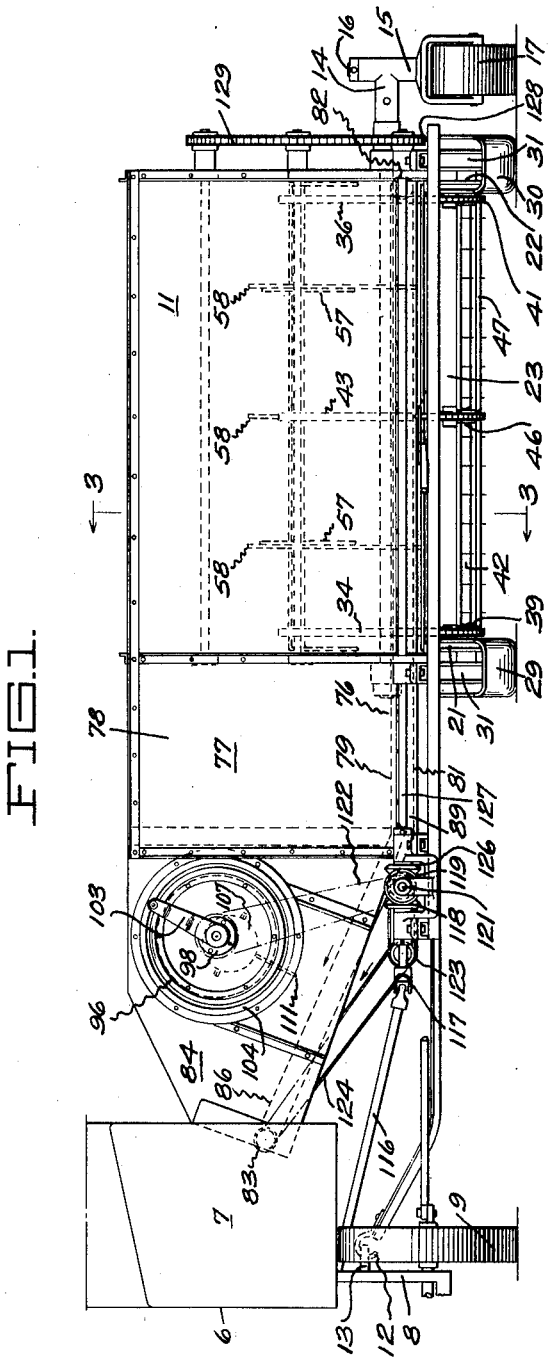
INVENTOR:
Elmer E. Wickersham
BY White, Prost & Fryer
ATTORNEYS.

Aug. 22, 1933.  E. E. WICKERSHAM  1,923,405
PICK-UP FEEDER
Filed Jan. 24, 1928  8 Sheets-Sheet 2
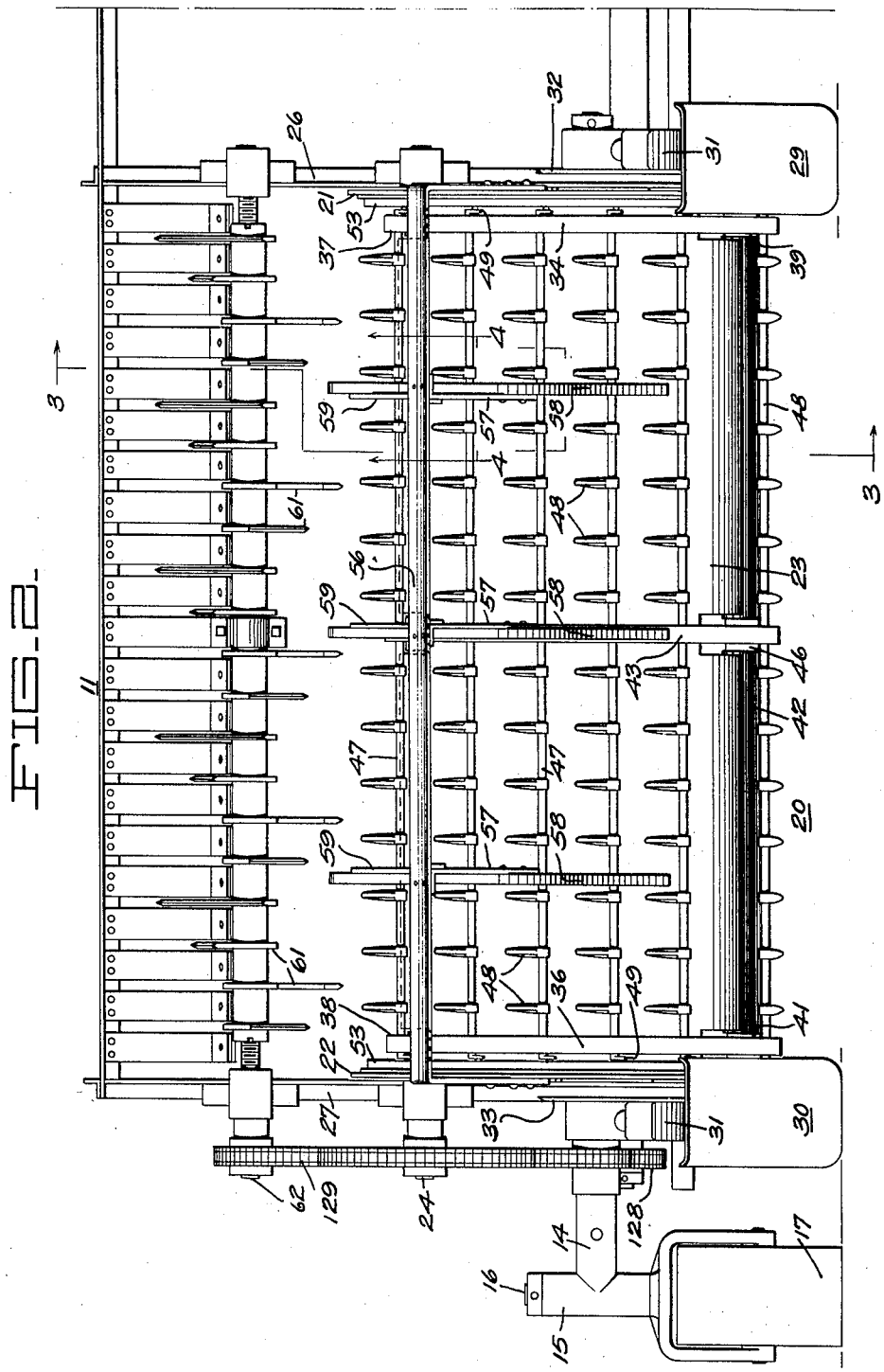
INVENTOR
Elmer E. Wickersham
BY
White, Prost & Fryer
ATTORNEYS

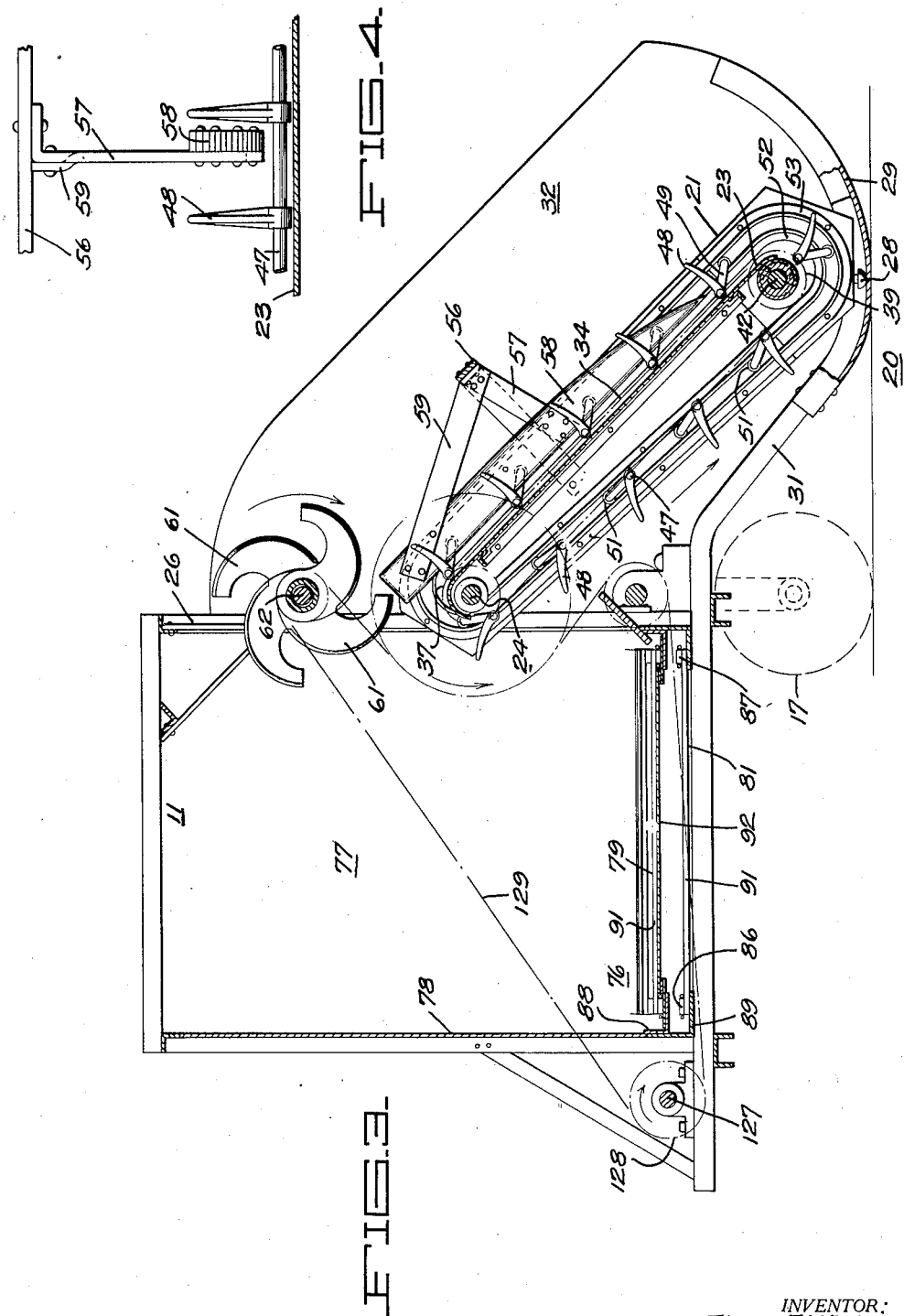

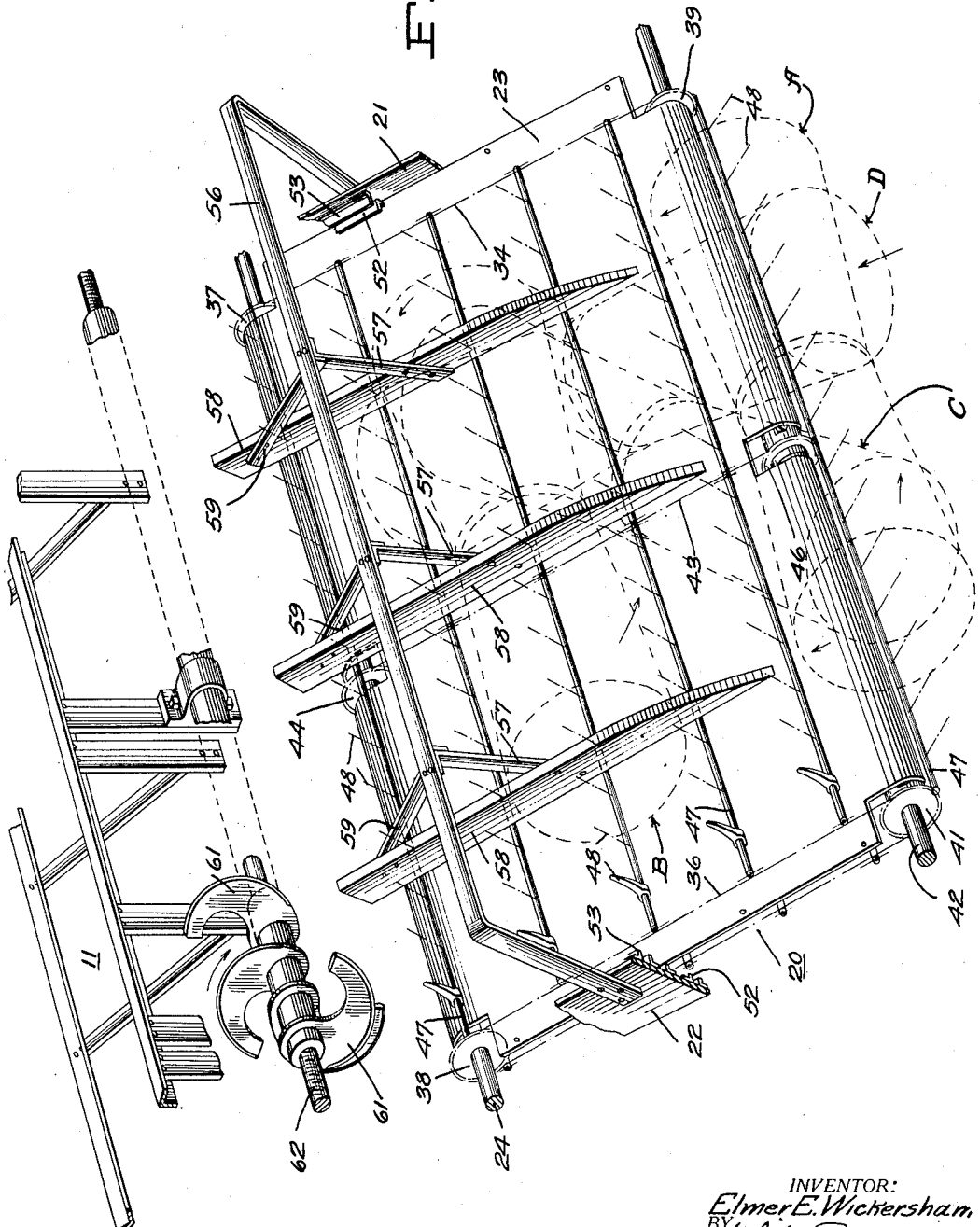

Aug. 22, 1933.   E. E. WICKERSHAM   1,923,405
PICK-UP FEEDER
Filed Jan. 24, 1928   8 Sheets-Sheet 5
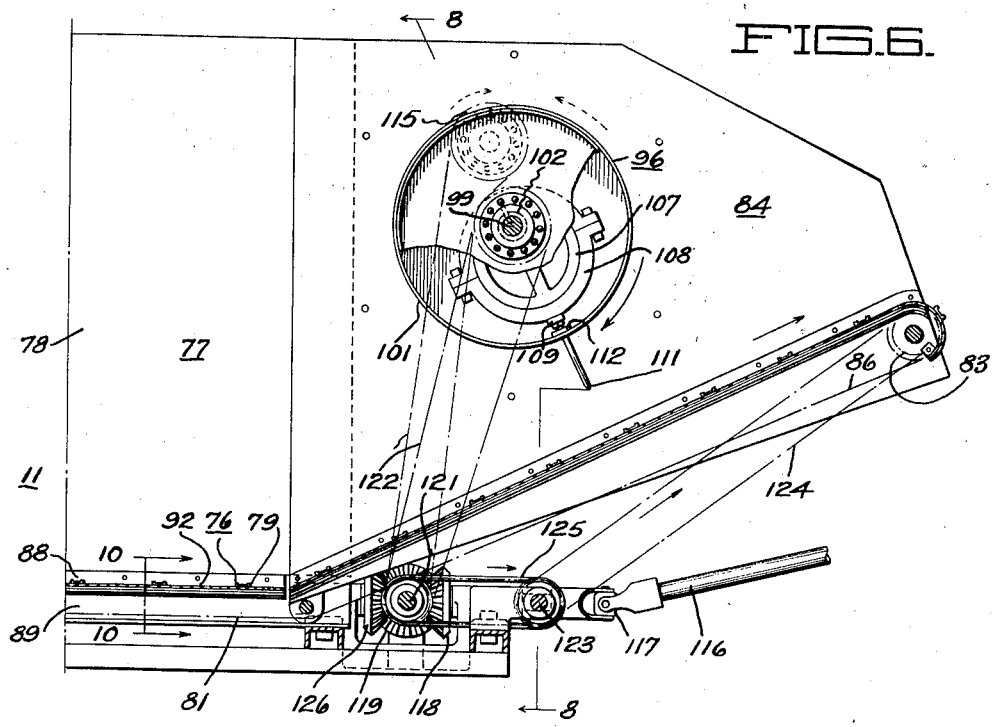
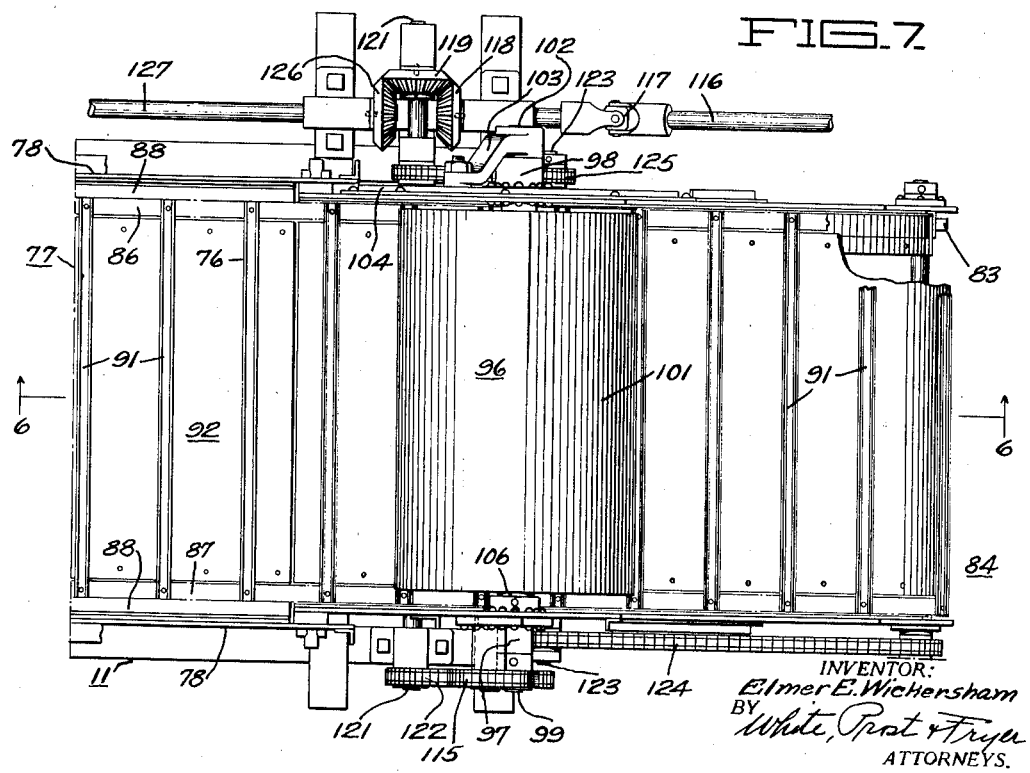
INVENTOR:
Elmer E. Wickersham
BY
White, Prost & Fryer
ATTORNEYS.

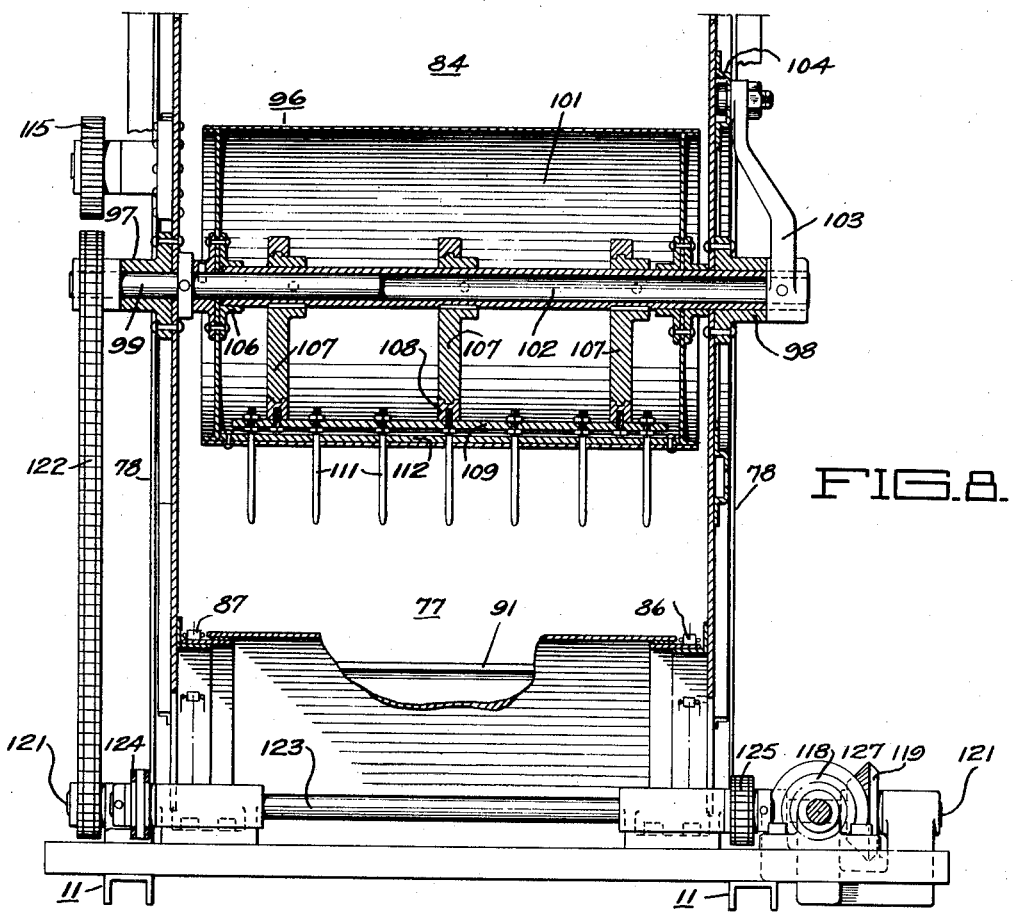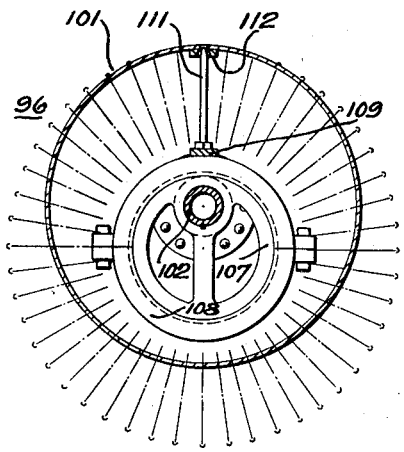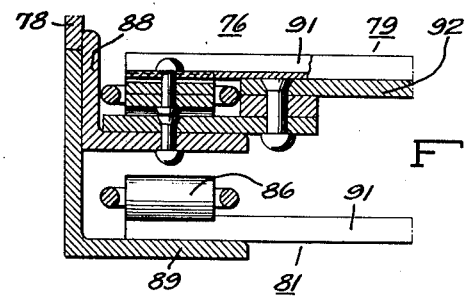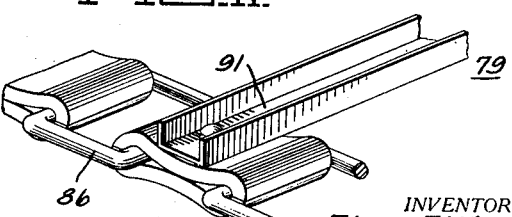

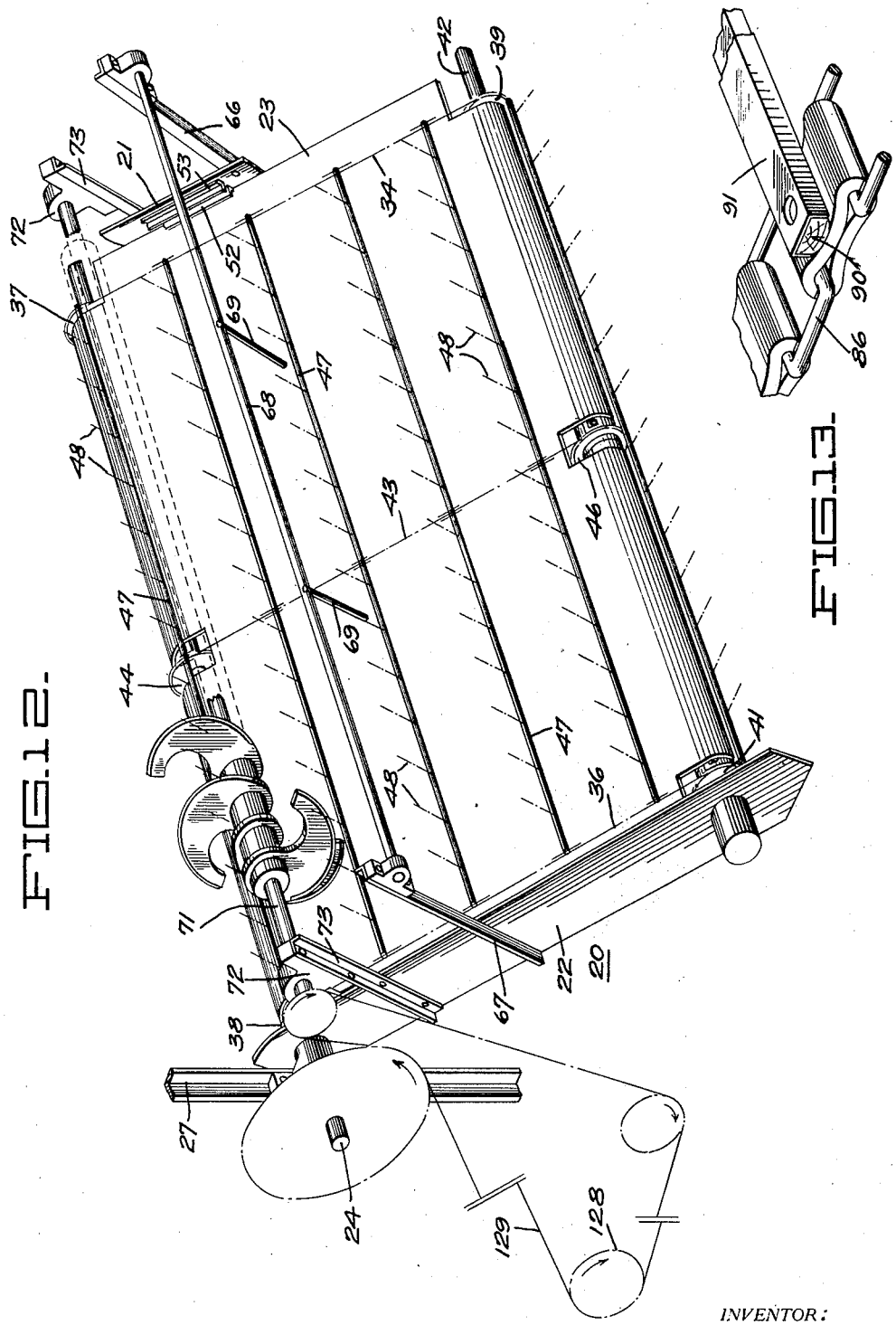

Aug. 22, 1933.  E. E. WICKERSHAM  1,923,405
PICK-UP FEEDER
Filed Jan. 24, 1928  8 Sheets-Sheet 8
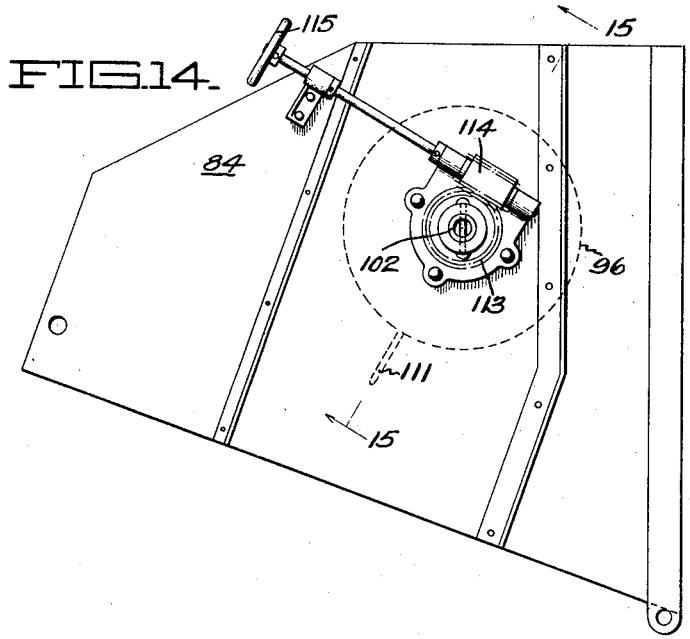
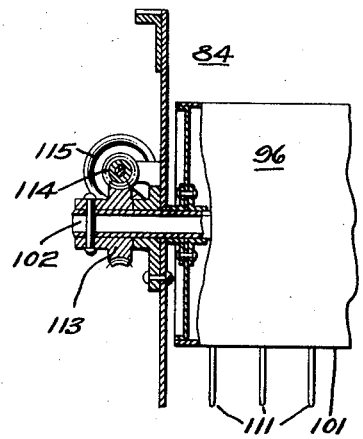
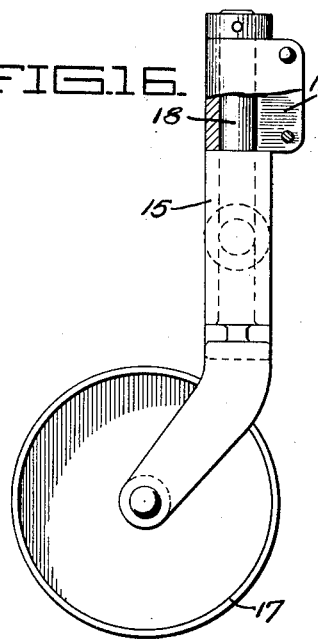
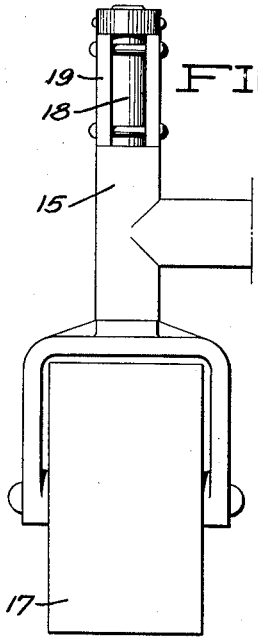
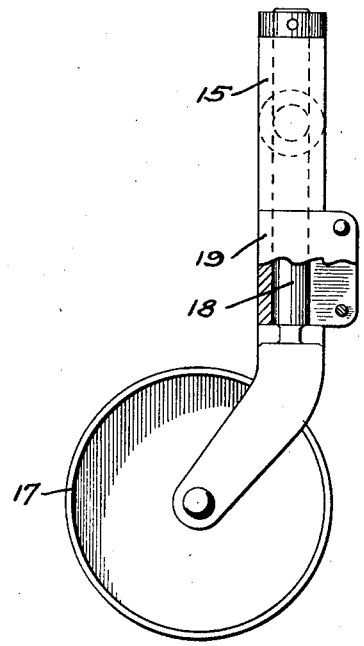
INVENTOR:
Elmer E. Wickersham
BY White, Prost & Fryer
ATTORNEYS.

Patented Aug. 22, 1933

1,923,405

UNITED STATES PATENT OFFICE 1,923,405

PICK-UP FEEDER

Elmer E. Wickersham, Stockton, Calif., assignor, by mesne assignments, to Caterpillar Tractor Co., San Leandro, Calif., a Corporation of California Application January 24, 1928. Serial No. 249,006

53 Claims. (Cl. 56—364)

My invention relates to harvesting machinery and particularly to that class of apparatus disclosed in the co-pending application of Jacob Clove, entitled Pick-up header, and bearing Serial No. 186,138, now Patent No. 1,891,748, granted December 20, 1932. Harvesting machinery of this type usually comprises a carriage adapted to be propelled over a field of grain and includes mechanism for gathering and threshing the grain. These machines are especially adapted to operate with grain that has previously been cut by other apparatus and has either been left lying on the field broadcast or in windrows, or has been tied into bundles stacked in shocks. A pick-up mechanism is incorporated in the machines to gather from the ground the grain lying broadcast or in windrows and to engage the bundles stacked in shocks. The gathered grain is propelled to a conveyor, such as a standard draper, by which it is carried to the separating unit of a standard combined harvester.

When loose grain is picked up from windrows on the field, it is comparatively a simple matter to insure a uniform feed thereof to the separating mechanism as the feed then depends primarily upon the speed of advance of the carriage. On the other hand, when the grain is in bundles making up shocks, the reception of grain in the machine is very irregular. When the carriage encounters a shock several bundles are almost immediately engaged, but there then elapses an interval while the machine travels to the next shock during which no bundles whatsoever are engaged. The resulting intermittent feed is not conducive to good threshing as the separator mechanism works best when it is fed a substantially constant amount of grain.

During the progress of tied bundles from the field into the separator, the bands binding them are cut to release the grain. It is practically essential that every band be cut as a tied bundle encountering the cylinder of the threshing unit imposes a terrific strain on the mechanism. It often occurs that although the bundles of grain are more or less uniformly arranged in a shock they become impaled in a haphazard fashion on the pick-up arrangement so that they are not always advantageously located for severance of their binding bands and are not always arranged in the best manner for feeding to the threshing mechanism.

It is therefore an object of my invention to provide means for arranging in a selected order the bundles of grain which are engaged in a haphazard manner by the pick-up mechanism.

Another object of my invention is to provide means for presenting the tied bundles to the band severing means in such a manner that there is assurance that the binding ties will be severed.

A further object of my invention is to improve the cutting action of the band severing devices.

A further object of my invention is to regulate accurately the feeding of grain to the separator.

My invention possesses other advantageous features some of which with the foregoing will be set forth in the following description where I shall outline in full that form of the pick-up feeder of my invention, which I have selected for illustration in the drawings accompanying and forming part of the present specification. In said drawings I have shown one form of pick-up feeder embodying my invention, but it is to be understood that I do not limit myself to such form since the invention, as set forth in the claims, may be embodied in a plurality of forms.

In the drawings:

Fig. 1 is an elevation from the rear of the pick-up feeder of my invention as it is attached to the separator portion of a combined harvester.

Fig. 2 is a front elevation of my invention, showing particularly the pick-up.

Fig. 3 is a section transversely thru the pick-up, the plane of section being indicated by lines 3—3 of Figs. 1 and 2.

Fig. 4 is a cross section on the line 4—4 of Fig. 2.

Fig. 5 shows the pick-up in perspective, certain parts being broken away to clarify representation.

Fig. 6 is a vertical section thru the spout showing the retarder, the plane of section being indicated by line 6—6 of Fig. 7.

Fig. 7 is a plan of the spout portion of my pick-up feeder, showing particularly the retarder and the drive mechanism.

Fig. 8 is a transverse section thru the retarder, the plane of section being indicated by line 8—8 of Fig. 6.

Fig. 9 is a diagrammatic study of the retarder.

Fig. 10 is a detail showing in section the construction of the draper, the plane of section being indicated by line 10—10 of Fig. 6.

Fig. 11 shows in perspective a portion of the draper chain with a stick affixed thereto.

Fig. 12 shows in perspective the pick-up with a modified mounting for the band cutter.

Fig. 13 is a perspective view similar to Fig. 11 but showing a modified form of draper stick on the draper chain.

Fig. 14 is a side elevation of the spout showing a modified regulator for the retarder.

Fig. 15 is a cross-section on the line 15—15 of Fig. 14.

Fig. 16 is a side elevation of the frame connection with the caster wheel.

Fig. 17 is a front elevation of the structure shown in Fig. 16.

Fig. 18 is a side elevation similar to Fig. 16 but showing the frame in raised position.

In its preferred form, the pick-up feeder of my invention preferably includes a pick-up header having means for arranging in selected order the engaged bundles of grain, improved means for severing the ties of the bundles, and means for accurately regulating the feeding of grain to the separator.

The particular embodiment of my pick-up feeder disclosed in the drawings is adapted to be attached to the separator portion 6 of a combined harvester. As is well known, the separator usually includes a feeder house 7 leading to suitable threshing machinery, and is suitably mounted on a frame 8 supported by ground wheels 9. The pick-up feeder proper preferably comprises a main frame 11, ordinarily fabricated of suitable metal shapes such as angles and channels, at its inner end attached by a hook 12 to a suitable eye 13 secured to the framework 8. The outer end of the main frame 11 terminates in an axle 14 having a vertical tube 15 within which pivots the yoke spindle 16 of a caster wheel 17. If desired, the tube 15 may receive an extended yoke spindle 18, as shown in Figs. 16, 17 and 18. A detachable collar 19 ordinarily is mounted on the spindle 18 above the tube 15, but when the pick-up feeder is being transported, the collar is placed on the spindle below the lifted tube 15 and affords increased ground clearance.

On the leading edge of the main frame 11 a pick-up framework is mounted. This framework 20 usually includes a pair of end boards 21 and 22 connected by a center board 23 which can conveniently be a sheet of metal. Preferably, the pick-up framework is pivoted to the main frame 11 by journaling the end boards 21 and 22 on an axle 24 which in turn is journaled in uprights 26 and 27 forming a part of the main frame 11. The framework 20 is thus free to pivot about the axis of the axle 24. The lower end of the pick-up framework is preferably adjustably supported by screws 28 in threaded engagement with the end boards 21 and 22 and bearing with their hemispherical heads on skids 29 and 30 of arcuate, concave contour secured to extensions 31 of the main frame 11. By suitably revolving the screws 28, the height of the leading edge of the pick-up framework can readily be adjusted. The skids 29 and 30 ordinarily support sheet metal shields 32 and 33 for protecting the pick-up from cross winds.

Mounted between the end boards 21 and 22 is a conveyor ordinarily termed the pick-up. The conveyor preferably comprises two end chains 34 and 36 at their upper ends passing around sprockets 37 and 38 affixed to the axle 24 and at their lower end passing around sprockets 39 and 41 secured to an axle 42 journaled in the lower portion of the end boards 21 and 22. If the proportions of the pick-up are such that there is comparatively a long span between the chains 34 and 36, I preferably provide an intermediate chain 43 passing around a sprocket 44 mounted on the axle 24 and around a sprocket 46 mounted on the axle 42. Journaled in irregular links in the chains are parallel bars 47. Tangs 48 are affixed to the bars 47 at regular intervals and project generally radially therefrom. The tangs are effective to engage grain lying broadcast on the field or to engage bundles of grain stacked in a shock.

To provide a proper motion for the tangs as they come into position for engaging bundles of grain, the bars 47, which are rotatable within the chains 34 and 36, are at their extremities provided with cranks 49 having end rollers 51 running between pairs of angles 52 and 53 forming tracks on the end boards 21 and 22. The track encompasses the path of the chain but deviates therefrom in predetermined amounts so that the cranks are effective in rotating the bars 47 within the irregular chain links to turn the tangs 48 from their normally radial position to the proper position for engaging the bundles of grain. The foregoing description is of a pick-up mechanism largely similar to the one disclosed in the above identified application of Jacob Clove.

Although the bundles of grain are firmly impaled on the tangs 48 during the operation of the machine, they are usually engaged in a somewhat haphazard manner and with the ordinary construction are not always arranged in the most advantageous way for further treatment. Since the shocked grain is always tied in bundles with the grain heads at one end and the band or tie passing circumferentially around the center of the bundle, I preferably present all of the bundles to the band severing means in a selected way so that the band extends transversely of the cutting knife. In this way there is no possibility of a band remaining parallel to the knives and passing between them unsevered. To this end, I preferably provide means for arranging in a predetermined manner the bundles which are engaged in a haphazard fashion. One form of mechanism for accomplishing this result is shown in Fig. 5.

Preferably secured to the end boards 21 and 22 of the pick-up framework 20 is an arch 56 usually formed of a metal strap extending entirely across the pick-up mechanism. Abutments 57 are fastened to the arch and extend toward the center board 23. At the lower ends of the abutments there are preferably provided wedges 58, conveniently fabricated of metal shapes, disposed to increase in height from their leading edges toward their trailing edges. These wedges in vertical extent range from very close to the bars 47 to a point slightly above the tangs 48. They are preferably more or less evenly spaced throughout the width of the pick-up mechanism and are preferably closer together than the usual length of a bundle of grain. The rigidity of the construction is increased by braces 59 extending from the arch 56 to the trailing edges of the wedges. Other functions of this structure will be presently set forth at length.

To sever the ties of the bundles carried by the pick-up mechanism, there is mounted on the main frame 11 a band cutter which includes a plurality of crescent shaped knives 61 preferably evenly spaced on a shaft 62 journaled in the main frame 11 and suitably driven in a direction opposite to the direction of movement of the tangs 48. As the bundles of grain pass the band cutter, the rapidly revolving knives sever the tying bands. The action of the abutments 57 and the wedges 58 is to arrange in a predetermined manner the bundles of grain which are engaged in a haphazard fashion. All of the bundles which progress with their retaining bands substantially transverse of the direction of motion of the bundles, readily pass between the abutments 57 and the wedges and are sure to have their bands quickly cut by knives 61. In ordinary structures, bundles which are engaged by the tangs with their restraining bands substantially parallel to the direction of motion of the bundles might pass uncut between two of the knives 61. But with my construction such bundles come into contact with one or more of the wedges 58 as they are advanced by the tangs and are thereby lifted almost entirely from the tangs 48. They are still impelled further along the pick-up mechanism, and soon contact one or more of the abutments 57 and are thereby turned so that their bands extend substantially transversely of the direction of motion of the bundles. This turning is indicated in Fig. 5 by the bundles of grain shown in dotted lines, position A being the position in which a bundle is engaged by the tangs 48 at the leading edge of the pick-up mechanism. The bundle is carried on the pick-up in the relative position shown at B, while contact with the wedge 58 lifts the bundle slightly and turns it in the direction indicated in position C. Further movement on the pick-up finally turns the bundles so that its band is transverse of the direction of motion, as shown in position D. In this last position the bundle passes readily between the abutments 57 and is suitably disposed for severance of the band by the band cutter.

In this wise, no matter how haphazard the position of the bundles when they are engaged and received by the pick-up mechanism, those that are not suitably disposed are arranged in a predetermined or selected manner prior to their encounter with the band cutters, thus assuring that the binding bands of all the bundles of grain will be severed and the grain suitably released.

As an alternative form of mechanism for insuring that the bundles approach the band cutter in the proper direction, I have shown in Fig. 12 a pick-up mechanism with two uprights 66 and 67 attached to the end boards for supporting at their upper ends a cross bar 68. Together with the uprights, the bar forms an arch over the pick-up mechanism. From spaced points on the bar 68, there depend abutments 69 conveniently formed of rods inserted thru the bar and fastened in place to extend downwardly almost into contact with the transverse bars 47 carrying the tangs 48. The action of this modification is somewhat different from that previously described inasmuch as incorrectly positioned bundles of grain are not lifted from the tangs 48. However, when bundles come into contact with the abutments 69 they are forced around into proper position due to the relative motion between the abutments 69 and the tangs 48. Occasionally the turning of such a bundle is accompanied by bursting of its restraining band thereby relieving the band cutter of some work.

In this modification, there is also disclosed a different location for the band cutter which in some instances facilitates greatly its operation. The band cutter was previously shown as being mounted on the main frame 11. In Fig. 12, the band cutter 71, although made identically in the same manner as the previously described band cutter, is shown mounted in journal blocks 72 supported by angle irons 73 secured to the end boards 21 and 22 and located intermediate the receiving and discharge ends of the pick-up mechanism. This location of the band cutter affords a firmer backing or support for the bundles when they are presented to the band cutter. If the bands are cut just as the bundles are discharging from the pick-up, they are sometimes infirmly supported and the cutters have the effect of aiding in the discharge of the bundles without severing their ties. With the location of the band cutter directly over the pick-up mechanism, however, and a short distance in advance of the discharge end thereof, the pick-up forms a firm backing or support for the bundles and the band cutters work to advantage.

From the upper end of the pick-up mechanism, the properly arranged bundles with their bands severed, are discharged onto a draper 76 located at the bottom of a chamber 77 partially or entirely closed by sides 78 forming a portion of the main frame 11. The draper preferably comprises a conveyor having an upper run 79 and a lower run 81 forming in effect a continuous belt passing at its outer end over a roller 82 journaled in the outer end of the frame 11 and at its inner end passing over a roller 83 journaled in the end of a spout 84 pivoted to the main frame 11.

The draper, however, instead of being the usual canvas belt with wood sticks secured thereto preferably comprises a pair of chains 86 and 87 situated at each side of the chamber 77 and running in suitable channels formed by angle irons 88 and 89 included in the frame 11. To the chains 86 and 87 at suitable intervals thereon are secured draper sticks 91, as shown in Figs. 10 and 11, preferably formed of channel irons riveted at their extremities to the links of the chains. As shown in Fig. 13, the channels can be inverted over wooden sticks 90. Intermediate the upper run 79 and the lower run 81 of the draper, is interposed a center sheet 92 preferably of metal suitably affixed to the upper angles 88. This particular draper construction is effective in propelling the received grain and carries forward any scattered grain kernels which may drop onto the center sheet 92.

The function of the draper is to carry the grain received from the pick-up toward the feeder house 7 of the separator portion 6, but inasmuch as the pick-up feeder often contacts a shock of grain comprising several bundles and discharges them within a short interval onto the draper and then does not encounter any shocks for a considerable interval of time, the deposition of grain on the draper is irregular and non-uniform.

Means are therefore provided for regulating the feed of grain on the draper to the separator so that the grain will discharge in a substantially uniform manner into the threshing mechanism despite the irregularity with which it is received on the draper. To this end I preferably mount on the framework 11 intermediate the ends of the draper 76 and preferably within the spout 84, a retarder 96 for impeding the progress of grain on the draper in excess of a predetermined amount. In this manner a predetermined quantity of grain is fed substantially constantly to the separator while the excess is retarded until a deficiency arises. The excess is then utilized to make up the deficiency so that a substantially uniform discharge of grain from the draper takes place.

A preferred construction for the retarder is as shown in Fig. 8 in which the sides of the frame 11 carry journals 97 and 98. Resting in the journal 97 is an axle 99 passing into the interior of a drum 101 secured to the axle to be rotatably mounted on a quill 102 passing thru the journal 98 and affixed to an adjusting arm 103 adjustably held in a retainer 104 secured to sides of the spout. The quill extends thru the drum and over the axle 99 to rest in a journal 106 on the interior of one of the drum heads. With this construction, when the axle 99 is rotated, the drum 101 rotates with it and permits the quill 102 to remain stationary. To the quill preferably are affixed cams or eccentrics 107 arranged to move with the quill in response to movements of the adjusting arm 103. Surrounding each eccentric is an eccentric strap 108 rotatable on the eccentric and secured to a tie strap 109 within the drum and extending parallel to the axis thereof. On the tie strap are mounted tangs 111 conveniently made of light rods suitably sharpened at their extremities and detachably held to the tie strap. The rods or tangs pass thru perforations in the periphery of the drum with a free sliding fit. Preferably the interior of the drum is equipped with a guide block 112 having conical passages therethru in registry with the apertures thru which the tangs 111 pass so that in case a tang is withdrawn from its corresponding aperture, it is guided back into the aperture by the strip 112.

The action of the retarded is alternately to eject and retract the series of tangs from the drum. This is effected by the revolution of axle 99 which turns the drum and at the same time constrains the tangs 111 to turn therewith. The tie strap 109 and eccentric straps 108, connected to the tangs, act as cam follower means and revolve about the relatively stationary eccentrics or cams 107. The tangs 111 are projected and retracted in accordance with the motion study as shown in Fig. 9. The point in the cycle at which the tangs are fully retracted is easily adjusted by moving the adjusting arm 103 to change the relative position of the eccentrics 107. A different means of adjusting the tangs is disclosed in Figs. 14 and 15. In this modification, the quill 102 is provided on its projecting end with a worm wheel 113 in engagement with a worm 114 revolved by a hand wheel 115.

Ordinarily the adjustment is made so that the tangs will be fully projected at the lowermost point in the revolution of the drum 101. The action of the retarder is thus to engage all of the grain extending more than a certain distance above the upper run of the draper and to impel the engaged grain in a direction opposite to the direction of draper motion, thereby retarding the grain. In effect, the excess grain is brushed from the top of a layer of grain of the maximum thickness desired to be discharged by the draper and is held in reserve until the layer of grain becomes deficient when the excess is enabled to pass below the reach of the projecting tangs 111.

It is the principal purpose in retracting the tangs adjacent the upper most portion of the drum movement to prevent the tangs from engaging grain and throwing it over the top of the retarder drum into the feeder house. Inasmuch as the tangs are flush with the surface of the drum adjacent the upper portion of its movement, they disengage any grain and prevent it from passing over the top of the retarder. The action of this retarder is thus quite different from the action of the feeder in the Clove machine which has for its purpose the engagement of grain to pass it over the feeder into the feeder house. It is possible however with the retarder shown in Fig. 9 to adjust the eccentric thru 180 degrees so that the tangs project their maximum amount as they pass the upper part of their cycle thereby engaging grain and throwing it into the feeder house over the top of the drum 101. Any other adjustment of the tangs is also possible as the eccentrics 107 can be rotated thru 360 degrees and, furthermore, by passing chain 122, lengthened if necessary, over an idler suitably located on the spout side 84 the direction of rotation of the drum can be reversed. Thus the drum and tangs can be operated to best advantage under all conditions.

The drive for the various moving units in my pick-up feeder is derived usually from a tumbler shaft 116 connected to the source of power on the separator mechanism. Shaft 116 drives through a suitable universal joint 117 to a bevel gear 118 in engagement with a second bevel gear 119 affixed to the end of a cross shaft 121. The cross shaft is connected by a chain 122 at its far end to the driving axle 99 for the retarder while at its near end it connects through a chain 125 to a cross shaft 123 engaging a chain 124 for driving the upper roll 83 of the draper. In mesh with the bevel gear 119 is another bevel 126 rotating a long shaft 127 extending for the entire length of the pick-up feeder and at its extremity carrying a sprocket 128 in engagement with the drive chain 129 for the pick-up mechanism and for the band cutter.

With the pick-up feeder of my invention it is possible to drive the carriage over a field and gather grain from windrows on the ground or to engage in a haphazard manner bundles from a shock and straighten them into a selected position for severance of their binding bands by a band cutter, and in either case to feed the grain into a separating mechanism at a substantially constant rate.

I claim:

1. A pick-up feeder comprising a pick-up adapted to engage bundles in a haphazard manner, and means for substantially disengaging said bundles from said pick-up to permit their arrangement in a predetermined manner thereon.

2. A pick-up feeder comprising a pick-up adapted to engage bundles in a haphazard manner and propel them, means for substantially disengaging said bundles from said pick-up, and means for arranging said substantially disengaged bundles in a predetermined manner.

3. A pick-up feeder comprising a pick-up adapted to engage bundles, and a wedge for substantially lifting said bundles therefrom.

4. A pick-up feeder comprising a pick-up framework, a pick-up movable over said framework and adapted to engage bundles, and a wedge mounted on said framework for lifting said bundles to disengage them from said pick-up.

5. A pick-up feeder comprising a pick-up adapted to engage bundles in a haphazard manner, a wedge for substantially disengaging said bundles from said pick-up, and an abutment for arranging said substantially disengaged bundles in a predetermined manner on said pick-up.

6. A pick-up feeder comprising a pick-up framework, a pick-up on said framework adapted at one end to receive bundles and at the other end to discharge bundles, tangs on said pick-up for engaging said bundles, and wedges extending over said pick-up and between said tangs, said wedges increasing in height toward the discharge end of said pick-up.

7. A feeder comprising a drum, a plurality of tangs projecting from said drum, means for revolving said drum, and means for varying the amount of projection of said tangs at a given point in the revolution of said drum.

8. A feeder comprising a drum arranged to revolve about an axis, and a plurality of tangs projecting from said drum and arranged to revolve about a different axis.

9. A feeder comprising an axle, an eccentric on said axle, a perforated drum on said axle and encompassing said eccentric, and tangs mounted on said eccentric and projecting through the perforations in said drum.

10. A feeder comprising an axle, an eccentric affixed thereto, a drum encompassing said eccentric and revoluble on said axle, an eccentric strap revoluble on said eccentric, tangs on said strap projecting from said drum, and means for revolving said drum.

11. A pick-up feeder comprising a main frame, a draper on said main frame, a pick-up framework on said main frame, a pick-up on said framework adapted to engage bundles of grain and discharge the grain onto said draper, and means for arranging said bundles in a selected manner whereby the grain is uniformly disposed on said draper.

12. A feeder comprising a draper, adapted to receive irregular quantities of grain, means for retarding certain portions of said grain whereby a substantially regular quantity of grain is discharged from said draper, and means for arranging the grain in a predetermined manner.

13. A feeder comprising, a pick-up framework, a pick-up on said framework adapted to engage bundles of grain in a haphazard manner, an abutment on said framework adapted to contact said bundles for arranging them in a selected manner and for permitting only bundles to pass which are arranged in said selected manner, a draper for receiving grain from said pick-up, and means for regulating the discharge of said grain from said draper.

14. A feeder comprising pick-up means adapted to engage tied bundles of grain in a haphazard manner, means adapted to contact said bundles for arranging them in a selected manner, band cutter means for severing bands tying arranged bundles, a draper for receiving grain from said pick-up means and means for retarding grain on said draper in excess of a selected amount.

15. In a pick-up, means for conveying engaged bundles, and means cooperatively associated with said conveying means for rejecting bundles engaged in other than a predetermined manner.

16. In a pick-up, means for engaging bundles, means for moving said engaging means to convey the engaged bundles, and means for substantially disengaging bundles from the engaging means which are engaged in other than a predetermined manner.

17. In a pick-up, means for engaging bundles, means for moving said engaging means to convey the engaged bundles, and means for substantially disengaging bundles from the engaging means which are engaged in other than a predetermined manner and for returning said disengaged bundles to engage said engaging means.

18. In a pick-up, means for engaging bundles, means for moving said engaging means to convey the engaged bundles, and means for substantially disengaging bundles from the engaging means which are engaged in other than a predetermined manner and for returning said disengaged bundles to engage said engaging means in substantially said predetermined manner.

19. In a pick-up, means for engaging variously disposed bundles, and means cooperatively associated therewith for disengaging bundles engaged by said engaging means in other than a predetermined manner.

20. A pick-up feeder comprising bundle conveying means movable over a substantially predetermined path, and means provided over a portion of said path to disengage bundles on said conveying means which are arranged in other than a predetermined manner.

21. A pick-up feeder comprising bundle conveying means movable over a substantially predetermined path, and means provided over a portion of said path to disengage bundles on said conveying means which are arranged in other than a predetermined manner and to return said bundles to engage subsequently said conveying means substantially in said predetermined manner.

22. A pick-up comprising pick-up means for engaging and conveying bundles, said means being movable over a predetermined path, a wedge extending over said pick-up means for a portion of said path, to disengage bundles on said pick-up.

23. A pick-up feeder comprising conveyor means for conveying grain, pick-up means for conveying bundled grain toward said conveying means, and means associated with said pick-up means for rejecting bundles engaged by said pick-up in other than a predetermined manner whereby grain discharged onto said conveyor means is arranged in a substantially predetermined manner on said conveyor means.

24. A feeder comprising conveying means for transporting grain, means adjacent said conveyor means for retarding the conveyance of grain in excess of a predetermined amount on a portion of said conveyor, and means for arranging the grain.

25. A feeder comprising means adapted to receive and to convey grain, control means for regulating the quantity of grain discharged from said conveyor means to a substantially predetermined quantity, and means for causing the grain to be discharged in arranged position.

26. A feeder comprising conveyor means for conveying grain, means adjacent to said conveyor means for regulating the volume of grain conveyed past said regulating means by said conveyor means, adjusting means for varying said regulating means to vary the volume of grain conveyed by said conveyor means past said regulating means, and means for arranging the grain.

27. A feeder comprising conveyor means for conveying grain, means adjacent to said conveyor means for regulating the volume of grain conveyed past said regulating means by said conveyor means, adjusting means for controlling the volume of grain conveyed by the conveyor means past said regulating means, and means for arranging the grain.

28. A feeder comprising means for conveying grain, a member rotatably mounted adjacent said conveyor means, grain engaging means arranged to project from the member during the rotation thereof to retard the passage of grain on said conveyor means, and means for arranging the grain.

29. A feeder comprising conveyor means adapted to receive quantities of grain intermittently whereby said conveyor is unevenly loaded, regulating means for retarding grain so that the discharge from the conveyor is substantially uniform, and means for arranging the grain.

30. A feeder comprising means for conveying grain, said grain being distributed on said conveying means in substantially uneven quantities, means for retarding grain in excess of a selected quantity, means for varying said selected quantity, and means for arranging the grain.

31. A feeder comprising grain engaging means, means for supporting said grain engaging means for rotation, means for conveying grain adjacent to said engaging means, means for moving both of said means so that said grain engaging means retard passage of grain on said grain conveying means, and means for arranging the grain.

32. A feeder comprising grain engaging means, means for supporting said grain engaging means, means for conveying grain adjacent to said engaging means, means for moving said grain engaging means relative to said supporting means to retard passage of grain on said grain conveying means, and means for arranging the grain.

33. A feeder, comprising a conveyor moving in one direction, a regulator moving in the opposite direction, and material arranging means.

34. A feeder, comprising a conveyor, a regulator, means to drive said regulator positively at uniform speed, and material arranging means.

35. A feeder, comprising a conveyor, a regulator, means to positively drive said regulator at constant speed and in a direction opposite to the direction of movement of said conveyor, and material arranging means.

36. A feeder, comprising a conveyor, a regulator, means to positively drive said regulator at constant speed and in a direction opposite to the direction of movement of said conveyor, means to adjust said regulator to variously control the output of said conveyor, and material arranging means.

37. In a feeder, means for conveying engaged bundles, means cooperatively associated with said conveying means for rejecting bundles engaged in other than a predetermined manner, and means for cutting a band binding a bundle conveyed past said rejecting means.

38. In a feeder, conveyor means movable over a path, means operative over a portion of said path for rearranging bundles on said conveyor means to a predetermined arrangement, and band cutting means positioned to cut bands on bundles conveyed past said rearranging means.

39. In a feeder, means for arranging bundles into a predetermined arrangement, means for cutting bands binding bundles, and means for conveying bundles to engage first said arranging means and then said band cutting means.

40. In a feeder, means for arranging bundles into a predetermined arrangement, means for cutting bands binding bundles, means for engaging bundles, and means for conveying engaged bundles to engage first said arranging means and the said band cutting means.

41. In combination, conveyor means, and a regulator movable, cooperably adjacent said conveyor means and having a plurality of extensible means adapted to engage material on said conveyor means and to retard conveyance of said material by said conveyor means.

42. In combination, conveyor means, and a regulator movable, cooperably adjacent said conveyor means and having a plurality of extensible means adapted to engage material on said conveyor means and to retard conveyance of said material by said conveyor means in excess of a predetermined quantity.

43. In combination, conveyor means, and a regulator movable, cooperably adjacent said conveyor means and having a plurality of extensible means adapted to permit conveyance by said conveyor means of material not in excess of a predetermined quantity.

44. In a feeder and the like, a rotatable member, a plurality of tangs peripherally about said member, means for mounting said tangs for movement in a substantially circular path with the member, and means including a cam follower element connected to each tang and a relatively stationary cam operable upon movement of the member for moving said tangs independent of their movement with the member.

45. In a feeder and the like, a rotatable member, a plurality of tangs peripherally about said member, means for mounting said tangs for movement in a substantially circular path with the member, and means including a cam follower element connected to each tang and a relatively stationary cam operable upon movement of the member for effecting change of position of said tangs with respect to the member at a predetermined position in their path of movement.

46. In a feeder and the like, a rotatable shaft, a plurality of tangs peripherally about said shaft, means for mounting said tangs for movement with said shaft and in a substantially circular path about said shaft, a cam about said shaft, and cam follower means contacting said cam and connected to said tangs to effect change of position of said tangs with respect to the shaft at a predetermined position in their path of movement.

47. The combination with a conveyor, of mechanism for controlling the quantity of material to be conveyed by the conveyor past a predetermined point, comprising means movable in a closed path for engaging material on the conveyor, and means for rendering said means incapable of removing material from the conveyor.

48. The combination with a conveyor, of mechanism for controlling the quantity of material to be conveyed by the conveyor past a predetermined point, comprising means movable in a direction opposite to the direction of movement of the conveyor and in a closed path for engaging material on the conveyor, and means rendering said means incapable of removing material from the conveyor.

49. The combination with a conveyor, of material regulating mechanism associated therewith, comprising a plurality of tangs arranged to move in a closed path adjacent the conveyor, means to move said tangs to engage material on the conveyor, and means rendering said tangs incapable of removing material from the conveyor.

50. The combination with a conveyor, of material regulating mechanism associated therewith, comprising a rotatable member mounted adjacent the conveyor, a plurality of tangs peripherally about said member, means for mounting said tangs for movement with the member, means to move said member and tangs for causing the tangs to engage material on the conveyor, and means for moving said tangs independent of their movement with the member to a position in which the tangs are incapable of removing material from the conveyor.

51. In a feeder and the like, a shaft mounted for rotation, a plurality of tangs peripherally about said shaft, means for mounting said tangs for movement with said shaft and in a substantially circular path about said shaft, an annular cam providing a trackway about said shaft, and cam follower means contacting said cam and connected to said tangs to effect change of position of said tangs with respect to said shaft upon movement of said tangs with said shaft.

52. In a feeder for a threshing machine, means for transporting grain to said threshing machine including means adapted to pick up bundles of tied grain from a field, cutting means positioned adjacent said transporting means for severing bands tieing said bundles of grain, and means for arranging the bundles to facilitate cutting of said bands by said cutting means.

53. In a mobile combined harvester-thresher, feeding means for transporting grain to a thresher including a pick-up adapted to remove bundles of grain from a field and a draper to receive grain from the pick-up, cutting means positioned to sever bands tieing said bundles of grain, means for arranging the bundles to facilitate cutting of said bands by said cutting means and to effect proper positioning of said grain on said draper for feeding thereof to said thresher, and feed control means positioned over said draper.

ELMER E. WICKERSHAM.